United States Patent
Isert et al.

(10) Patent No.: US 9,528,851 B2
(45) Date of Patent: Dec. 27, 2016

(54) USER DEVICE AND SYSTEM

(71) Applicant: Bayersiche Motoren Werke Aktiengesellschaft, Munich (DE)

(72) Inventors: Carsten Isert, Munich (DE); Marcello Tava, Munich (DE); Christian Gerstberger, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/461,053

(22) Filed: Aug. 15, 2014

(65) Prior Publication Data

US 2014/0358431 A1 Dec. 4, 2014

Related U.S. Application Data

(63) Continuation of application No. PCT/EP2013/051909, filed on Jan. 31, 2013.

(30) Foreign Application Priority Data

Feb. 16, 2012 (DE) .................. 10 2012 202 356

(51) Int. Cl.
*G01S 1/00* (2006.01)
*G01C 21/36* (2006.01)
*G01C 21/32* (2006.01)

(52) U.S. Cl.
CPC ........... *G01C 21/3688* (2013.01); *G01C 21/32* (2013.01)

(58) Field of Classification Search
CPC ..... G01C 21/32; G01C 21/36; G01C 21/3688; G01C 21/00; G01C 29/00; G06F 12/0811; G06F 12/0813; G08G 1/0969; G09B 29/10; H04B 7/26

(Continued)

(56) References Cited

U.S. PATENT DOCUMENTS 4,829,304 A * 5/1989 Baird .............................. 342/63
5,442,559 A * 8/1995 Kuwahara et al. ........... 701/446

(Continued)

FOREIGN PATENT DOCUMENTS

CN 1409087 A 4/2003
DE 10 2005 016 070 A1 10/2005

(Continued)

OTHER PUBLICATIONS

He et al., Sharing Trajectories of Autonomous Driving Vehicles to Achieve Time-Efficient, 2013, IEEE, p. 119-126.*

(Continued)

*Primary Examiner* — McDieunel Marc
(74) *Attorney, Agent, or Firm* — Crowell & Moring LLP

(57) ABSTRACT

A first user device comprises a first communication interface and a second communication interface. The first user device has digital first map information and is configured for outputting a request message for making navigation information available with regard to at least one desired route section, at the first communication interface. The second communication interface is configured for receiving navigation information that is made available in response to the request message, at the second communication interface, and comprises digital second map information for at least a part of the at least one desired route section. The digital second map information comprises data for display of the at least one part of the at least one desired route section. The first user device is configured for determining digitally updated map information as a function of the digital second map information of the navigation information and of the digital first map information, and for selecting an optical output device for display of the digital updated map information.

17 Claims, 1 Drawing Sheet

(58) Field of Classification Search
USPC .......... 701/461; 370/401, 389, 392; 340/990
See application file for complete search history.

(56) References Cited

U.S. PATENT DOCUMENTS

| | | | |
|---|---|---|---|
| 5,448,696 A * | 9/1995 | Shimada et al. ............. | 715/853 |
| 5,948,040 A * | 9/1999 | DeLorme et al. ............. | 701/426 |
| 6,185,502 B1 * | 2/2001 | Sumner et al. ............... | 701/461 |
| 7,260,475 B2 | 8/2007 | Suzuki | |
| 7,916,723 B2 * | 3/2011 | Fan et al. ...................... | 370/389 |
| 2003/0204308 A1 * | 10/2003 | Uchida ................. | G01C 21/32 |
| | | | 701/450 |
| 2005/0075116 A1 * | 4/2005 | Laird ...................... | A61B 5/04 |
| | | | 455/456.3 |
| 2010/0332119 A1 * | 12/2010 | Geelen .................. | G01C 21/32 |
| | | | 701/533 |

FOREIGN PATENT DOCUMENTS

| | | |
|---|---|---|
| DE | 10 2005 053 125 A1 | 5/2007 |
| DE | 10 2007 037 938 A1 | 2/2009 |
| DE | 10 2010 007 089 A1 | 8/2011 |
| EP | 1 298 416 A2 | 4/2003 |
| EP | 2 204 638 A1 | 7/2010 |
| EP | 2 280 242 A2 | 2/2011 |
| WO | WO 2008/091727 A1 | 7/2008 |
| WO | WO 2011/075682 A1 | 6/2011 |

OTHER PUBLICATIONS

International Preliminary Report on Patentability (PCT/IB/373) dated Aug. 19, 2014 (One (1) page).
Written Opinion (PCT/ISA/237) dated May 13, 2013 (Six (6) pages).
International Search Report dated May 13, 2013 (Two (2) pages).
German-language Search Report dated May 22, 2012, with Statement of Relevancy (Six (6) pages).
Chinese Office Action issued in Chinese counterpart application No. 201380015894.5 dated Sep. 18, 2016, with English translation (Twenty One (21) pages).

* cited by examiner

USER DEVICE AND SYSTEM

CROSS REFERENCE TO RELATED APPLICATIONS

This application is a continuation of PCT International Application No. PCT/EP2013/051909, filed Jan. 31, 2013, which claims priority under 35 U.S.C. §119 from German Patent Application No. 10 2012 202 356.9, filed Feb. 16, 2012, the entire disclosures of which are herein expressly incorporated by reference.

BACKGROUND AND SUMMARY OF THE INVENTION

The invention relates to a first user device and to a system having the first user device.

In the automotive field in particular, navigation aids are playing an increasingly important role in motor vehicles. For this purpose, a first user device, for example, can be installed in the vehicle in a fixed manner, and an optical output device, also installed in the vehicle in a fixed manner, can be assigned to it. Such user devices are regularly configured for the purpose of processing digital map information for display on the optical output device, and for controlling the optical output device accordingly. Aside from the digital map information, travel routes from a starting point to a destination, for example, and/or the current location of the vehicle, are also displayed on the optical output device. Such first user devices and corresponding output devices, and, if applicable, also input devices that also are particularly fixed in place in the vehicle, regularly demonstrate particularly great operating convenience and also an optically advantageous display of the information on the basis of optical output devices specifically set up for the vehicle environment. For example, clearly larger displays in comparison with portable navigation devices are frequently present here.

However, it is a challenge to keep the map data of the navigation device disposed in the vehicle in a fixed manner, on the basis of which navigation, route search or guidance to a destination are carried out. It is known to update the map data by means of an exchange of a corresponding replacement memory, such as a map data DVD (Digital Versatile Disc), for example. This is relatively complicated for the customer and for the vendor, not case-related, and generally takes place within the scope of relatively few versions per year and therefore at relatively large time intervals.

The task on which the invention is based is to create a first user device and a system having the first user device, which device or system allows reliable and/or current provision of navigation information by means of the first user device.

This task is accomplished by means of the characteristics of the independent claims. Advantageous embodiments of the invention are characterized in the dependent claims.

The invention is characterized, according to a first aspect, by means of a first user device having a first communication interface and a second communication interface. The first user device has digital first map information and is configured for outputting a request message for making navigation information available with regard to at least one desired route section, at the first communication interface. The second communication interface is configured for receiving navigation information that is made available in response to the request message, at the second communication interface, and comprises digital second map information for at least a part of the at least one desired route section. The digital second map information comprises data for display of the at least one part of the at least one desired route section. The first user device is configured for determining digitally updated map information as a function of the digital second map information of the navigation information and of the first digital map information, and for selecting an optical output device for display of the digital updated map information.

It is advantageous that if the first digital map information does not comprise the at least one route section or comprises it incorrectly, for example because a specific geographical region is not digitalized, is not updated and/or has not been described with sufficient accuracy, the navigation information for this route section can be requested, for example, from a central facility. The requested navigation information can then be made available to the first user device indirectly, by way of a second user device. The first and the second communication interface of the first user device are preferably configured as bidirectional interfaces, in each instance. The navigation information can be used for completion of a route display of the first user device. In this manner, for one thing, the route display that can be recognized by a user of the first user device can be made available in reliable and/or current manner. Furthermore, in this manner, a navigation function can be reliably made available even in complex destination regions, for example in shopping malls and airports; these are generally not included in the first digital map information stored in the first user device.

In addition, functionality of the second user device can be utilized to adapt the navigation information, for example to a current position of the first user device and/or of a vehicle. The first user device can be disposed in the vehicle in a fixed manner. Furthermore, the functionality of the second user device can be utilized to supplement the navigation information with further information. The navigation information can be supplemented with graphic elements and/or text information elements and/or content information elements for display and/or operation visualization element present in the first user device. Making the requested navigation information for the first user device available indirectly has the advantage that the additional functionality of the second user device can be utilized, and thereby the additional functionality can be made available even after installation of the first user device.

It is particularly advantageous that the first digital map information present in the first user device can be utilized, and the second digital map information of the navigation information can be embedded into it, and thereby the digital updated map information can be determined very easily. This makes it possible that only small amounts of data need to be transmitted, in each instance, particularly from the central device to the second user device.

According to an advantageous embodiment of the first aspect, the first user device is configured for determining the digital updated map information in such a manner that the second digital map information of the navigation information is displayed on the optical output device, superimposed on the first digital map information. This embedding by means of screen superimposition, also referred to as ground overlay or map overlay, allows flexible and simple optical display of the first and the second map information.

According to a further advantageous embodiment of the first aspect, the digital second map information comprises data for display of planned travel routes and/or of travel maneuver comments along the desired route section and/or of the current position of the first user device relative to the desired route section and/or of traffic comments. Advantageously, this makes it possible to make this further information available easily and to display it by means of the optical output device.

According to a further advantageous embodiment of the first aspect, the navigation information comprises map detail information and one or more graphic elements. Furthermore, the first user device is configured for embedding the graphic element(s) that is/are made available into the digital updated map information, for display of the map detail predetermined by the map detail information, and for selecting the optical output device for display of the predetermined map detail in response to the map detail information. This allows easy, flexible display of the graphic elements. This can allow an additional display of current position information in the map display on the optical output device, for example, without the second digital map information having to be updated, in each instance. It is particularly advantageous that the digital updated map information present in the first user device can be utilized, and only the additional graphic elements are embedded.

According to a second aspect, the invention is characterized by a system that has a first user device according to the first aspect, a central computer device, and a second user device. The central computer device has a communication interface that is configured for receiving the request message made available at the first communication interface of the first user device. The central computer device is configured for making central navigation information available at the communication interface, for transmission to the second user device, in response to the received request message. The central navigation information comprises the digital second map information for the at least one part of the at least one route section. The second user device comprises a third communication interface and a fourth communication interface. The third communication interface is configured for making the received central navigation information available to the second user device. The second user device is configured for making the navigation information available at the fourth communication interface, for transmission to the first user device, where the navigation information comprises the digital second map information for the at least one part of the at least one route section.

In this manner, advantageous embodiments of the first aspect apply also for the second aspect. It is advantageous that this allows making the requested navigation information available in a reliable and/or current and/or simple manner. Furthermore, this allows display of the navigation information, supported by the functionality of the second user device, in such a manner that the navigation information can be perceived in a simple manner by an observer of the optical output device.

According to a third aspect, the invention is characterized by a system that has a central computer device and a second user device. The central computer device has a communication interface that is configured for receiving the request message made available at the first communication interface of the first user device, and making available central navigation information at the communication interface, for transmission to the second user device, in response to the received request message, wherein the central navigation information comprises basic map information for the at least one part of the at least one route section. The second user device comprises a third communication interface and a fourth communication interface. The third communication interface is configured for making the received central navigation information available to the second user device. The second user device is configured for determining the digital second map information of the navigation information as a function of the basic map information, and for making the navigation information available at the fourth communication interface, for transmission to the first user device.

In this manner, advantageous embodiments of the first aspect also apply for the third aspect.

It is advantageous that this allows making the requested navigation information available in a reliable and/or current and/or efficient manner. Furthermore, this allows display of the navigation information, supported by the functionality of the second user device, in such a manner that the navigation information can be perceived in a simple manner by an observer of the optical output device.

The second user device is particularly configured as a mobile device, and can be a smartphone, for example. The second user device can comprise a running time environment, for example a mobile operating system or a browser. The third and the fourth interface of the second user device are preferably configured as a bidirectional interface, in each instance. The second user device can be equipped with suitable computing capacity, for example, in a simple manner, which capacity is required for any computing operations that might have to be performed in advance of making the navigation information available. Furthermore, it can be easily updated with regard to its software, for example, and is thereby easily adaptable.

In an advantageous embodiment of the second and third aspect, the fourth communication interface of the second user device is configured for making received operating information that is made available by the first user device at the second communication interface available to the second user device. In this manner, the second user device can utilize operating information that is otherwise only available in the first user device, for example, such as information about the precise position of the vehicle, the travel speed, the gas tank level, and the like, for example, in order to determine the navigation information. Furthermore, the operating information can comprise user input information, and the navigation information can be adapted to the user input information.

According to a further advantageous embodiment of the second and third aspect, the second user device is configured for determining the digital second map information as a function of the operating information.

According to a further advantageous embodiment of the second and third aspect, the operating information comprises geographic coordinates recorded for the current position of the first user device. This makes it possible to make the digital second map information, with the desired route section, available as a function of a local relationship of the first user device, for example to send the navigation information with the digital map information to the first user device only once the current position of the first user device has a distance from the at least one desired route section that is less than a predetermined distance.

According to a further advantageous embodiment of the second and third aspect, the second user device is configured for determining a most probable position of the first user device with reference to the basic map information and/or with reference to the digital second map information as a function of the geographic coordinates recorded for the current position of the first user device.

It is particularly advantageous if the basic map information or the digital second map information is utilized for such map adaptation, also called map matching, because this is preferably more current and contains fewer errors than the digital first map information. If the geographic coordinates measured using a positioning method are directly shown in the coordinate system of a digital map, then the true position of the object on the map can deviate from the imaged position of the object on the map, for example due to measurement errors during the positioning method and/or due to inaccuracies of the map. The recorded position can be balanced out using information about the location and geometries of objects of the basic map information and/or of the digital second map information, so that the most probable position of the object can be determined with reference to the basic map information or with reference to the digital second map information, respectively.

According to a further advantageous embodiment of the second and third aspect, the second user device is configured for determining the second digital map information as a function of the most probable position of the first user device, as determined.

According to a further advantageous embodiment of the second and third aspect, the second user device is configured for determining the map detail information and the assigned graphic elements of the navigation information as a function of the central navigation information and/or of the operating information.

Exemplary embodiments of the invention will be explained in greater detail below, using the schematic drawings. These show:

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same design or function are indicated with the same reference symbols on both figures.

Figure 1:
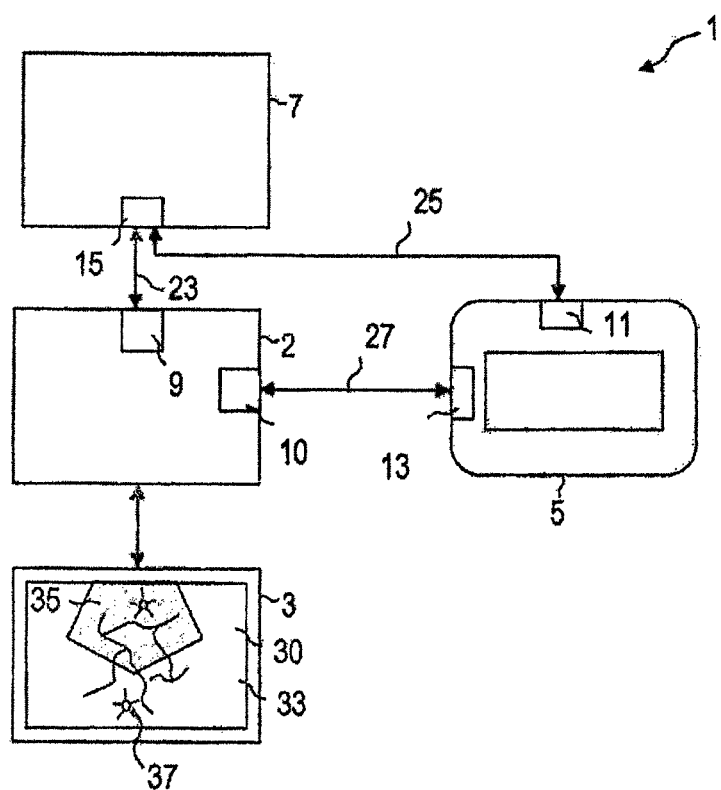
FIG. 1 a system having a first and second user device, and
FIG. 2 a schematic representation of an optical output on an optical output device.

A system 1 (FIG. 1) comprises a first user device 2, an optical output device 3 assigned to it, and, if applicable, an acoustical and/or haptic output device assigned to the latter, a second user device 5, and a central computer device 7.

The first user device 2 preferably comprises a processing unit disposed in a vehicle in a fixed manner. The first user device 2 has a first communication interface 9 that is a wireless, bidirectional communication interface, particularly a mobile telephony interface, for example. Furthermore, the first user device 2 has a second communication interface 10, which can be a Bluetooth interface, a USB interface, a WLAN interface, or another suitable bidirectional interface, for example. The first user device 2 is electrically coupled with the optical output device 3, for example in such a manner that it can control the optical output on the optical output device 3 by means of corresponding signals. Alternatively, or in addition, the first user device 2 can also be coupled with the optical output device 3 in optical and/or mobile-telephony manner, for this purpose. The first user device 2 and the optical output device 3 particularly form what is called a head unit.

The second user device 5 is configured as a mobile device, for example, and can be a smartphone. The second user device 5 has a fourth communication interface 13 by means of which it can communicate with the second communication interface 10 of the first user device 2. The fourth communication interface 13 of the second user device 5 is accordingly configured to be compatible with the second communication interface 10 of the first user device 2, and can therefore also be a Bluetooth interface or also a USB interface or a WLAN interface, for example.

Furthermore, the second user device 5 comprises a third communication interface 11, which is preferably configured as a mobile telephony communication interface. By means of this interface, it can communicate with the central computer device 7 directly or indirectly.

The central computer device 7 also has a communication interface 15.

The first user device 2 has a data memory in which first digital map information is stored. This first digital map information can also comprise node information and also connection information (link information), among other things.

Furthermore, a program for implementing a navigation aid can be present in a program memory of the first user device 2, which aid comprises determining a route from a starting point to a destination point.

Furthermore, at least one program that is configured for generating signals for turning on the optical display device 3 is stored in the program memory of the first user device 2, in such a manner that digital data information determined as a function of digital map information is output on the optical display 3. The functionality for this can comprise a zoom function or what is called a panning function, for example. Furthermore, the digital data information can also be displayed in different views, for example, and the routes determined by the navigation aid, or other routes, for example, can also be displayed within a map detail that is shown.

Furthermore, the first user device 2 can comprise programs for display of graphic symbols, for example destinations of interest (points of interest, POI). Furthermore, corresponding functionality can be implemented for display of predetermined elements, such as lists, for example, which can be filled with destinations or the like. Furthermore, switching to full screen mode can also be possible by means of one or more corresponding programs. Furthermore, a corresponding functionality for display and/or inclusion of a tool bar can also be present. Furthermore, one or more corresponding programs for allowing scrolling on the screen, with corresponding shifting of the map detail shown, can also be present.

Furthermore, what is called an interactive map function can also be present, by means of one or more programs, by means of which programs elements can be selected on the map, using a predetermined operating element, such as a touch screen field or also a combined rotational/push button. Corresponding user input information can be generated, which characterizes the selected element, for example, and can be an identification number and/or characterizes a screen position, for example.

Furthermore, one or more programs can also be stored in memory, which allow emphasis of predetermined elements when they run and/or can generate a popup menu or some other message to the user.

The first user device 2 is configured for making a request message for making navigation information for a desired route section available at the first communication interface 9.

The desired route section can be, for example, a route section for which the first digital map information has no and/or obsolete and/or insufficiently detailed data.

If, for example, it is determined that a route section is not contained in the first digital map information, the first user device 2 can request the navigation information with regard to the route section not contained in the first digital map information from the central computer device 7.

The fact that the route section is not contained in the first digital map information can be determined, for example, in that the central computer device 7 calculates a travel route that comprises different route sections, as a function of digital map information and as a function of a starting location and a destination location, each of which was transmitted to the central computer device 7 by the first user device 2. Route data that characterize the calculated travel route are transmitted to the first user device 2 by the central computer device 7. The first user device 2 checks whether the calculated travel route comprises a route section that is not contained in the first digital map information. If it is determined that a route section is not contained in the first digital map information, the first user device 2 can make the request message to make the navigation information available, with regard to the desired route section, available at the first communication interface 9.

The first communication interface 9 is configured for sending the request message to the central computer device by way of a first channel connection 23. The first channel connection 23 couples the first communication interface 9, at least logically, with the communication interface 15 of the central computer device 7.

The central computer device 7 is configured for receiving the request message made available at the first communication interface 9 of the first user device 2, by way of the communication interface 15, and for making available central navigation information at the communication interface 15, in response to the received request message, for transmission to the second user device 5.

The communication interface 15 is configured for sending the central navigation information to the second user device 5, by way of a second channel connection 25. The second channel connection 25 couples the communication interface 15 of the central computer device 7, at least logically, with the third communication interface 11 of the second user device 5.

The central navigation information can comprise the digital second map information for the at least one part of the at least one route section. The second digital map information can have a bitmap data format, for example. The central computer device 7 can be configured, for example, for converting map data for the at least one part of the at least one route section, which are described as a vector graphic, for example, to the digital second map information, which is described as a raster graphic, for example. The conversion of a vector graphic to a raster graphic is also called rendering. The digital map information can additionally comprise, along with the data for display of the at least one part of the desired route section, data for display of a planned travel route and/or of driving maneuvers along the desired route section and/or of the current position of the first user device 2 relative to the desired route section and/or of traffic comments.

In addition, but particularly alternatively, the central navigation information can comprise basic map information for the at least one part of the at least one route section. The basic map information comprises, for example, the map data for the at least one part of the at least one route section. The basic map information can be described, for example, at least in part as a vector graphic and/or as a raster graphic.

In addition to the digital second map information and/or the basic map information, the central navigation information can comprise travel route data and/or driving maneuver comments and/or traffic information along the desired route section, for example.

The central computer device 7 can be configured, for example, for transmitting the central navigation information to the second user device 5 in accordance with the defaults of Keyhole Markup Language (KML).

The third communication interface 11 of the second user device 5 is configured for making the received central navigation information available to the second user device 5. The fourth communication interface 13 is configured for sending the navigation information to the first user device by way of a third channel connection 27. The third channel connection 27 couples the fourth communication interface 13, at least logically, with the second communication interface 10 of the first user device 2.

In a first embodiment of the system 1, the central navigation information comprises at least the digital second map information, and the second user device 5 is configured for making the navigation information that comprises the digital second map information for the at least one part of the at least one route section available at the fourth communication interface 13, for transmission to the first user device 2. In this case, the digital map information is passed on to the first user device 2, unchanged, by way of the second user device 5.

In a second embodiment of the system 1, the central navigation information comprises the basic map information, and the second user device 5 is configured for determining the digital second map information of the navigation information as a function of the basic map information, and for making the navigation information that comprises the digital second map information available at the fourth communication interface 13, for transmission to the first user device 2.

In a third embodiment of the system 1, the second user device 5 is configured not only for passing on the digital second map information, if it is contained in the received central navigation information, unchanged, to the first user device 2, but also, if the received central navigation information comprises the basic map information, for determining the digital second map information.

The second user device 5 can be configured, for example, for converting the basic map information, which is described as a vector graphic, for example, to the digital second map information, which is described as a raster graphic, for example.

In addition or alternatively, the second user device 5 can be configured for determining the digital second map information in such a manner that this information additionally comprises data with regard to display of the planned travel route, of driving maneuver comments along the desired route section and/or of the current position of the first user device 2 relative to the desired route section and/or of traffic comments. This further information, particularly driving maneuver comments and/or traffic comments, can be comprised by the central navigation information. However, alternatively or in addition, this further information can be made available to the second user device 5 in some other way.

Furthermore, the second user device 5 can be configured for adding further information to the basic information, if this is already described as a raster graphic, for example, and/or for undertaking a size and/or detail adaptation.

The first user device 2 can be configured, for example, for making operating information available at the second interface, for transmission to the second user device 5. The fourth communication interface 13 of the second user device 5 can be configured for receiving the operating information and making it available to the second user device 5. The operating information can comprise, for example, a recorded speed of the vehicle and/or a gas tank level and/or a load state and/or recorded geographic coordinates for the current position of the first user device 2 and/or of the vehicle.

In this manner, the second user device 5 can utilize the operating information, for example, which is otherwise only available in the first user device 2, such as information about the precise position of the vehicle, the travel speed, the gas tank level, and the like, in order to determine the navigation information.

The second user device 5 can be configured for determining the digital second map information as a function of the operating information. This makes it possible, for example, to determine the digital second map information and to display it as a function of a local relationship of the first user device 2 with the desired route section for which the navigation information was requested.

The second user device 5 can furthermore be configured for determining a most probable position of the first user device 2 with reference to the basic map information and/or the digital second map information, as a function of the recorded geographic coordinates for the current position of the first user device 2.

It can be provided that the current position of the first user device 2 is displayed by means of the optical output device 3. This can take place in such a manner that the digital second map information comprises the data for display of the current position.

Alternatively or in addition, however, it can be provided that the display of the position takes place with a supplemental symbol, and that this and/or other symbols are sent to the first user device 2 separately from the second user device 5. For this purpose, the navigation information can comprise map detail information and one or more graphic elements, in each instance.

Such graphic elements of the navigation information can be transmitted to the first user device 2 as a KLM file (Keyhole Markup Language), for example, by the second user device 5.

Furthermore, the navigation information can additionally or alternatively comprise text information elements and/or content information elements for display of further information elements.

A program can be stored in the program memory of the second user device 5, for example, which program runs during operation of the second user device 5, and is configured for making the graphic elements, for example with predetermined geo-reference information, available at the fourth communication interface 13 of the second user device 5, for transmission to the first user device 2.

The second user device 5 can be configured for determining the map detail information and the assigned graphic elements of the navigation information as a function of the central navigation information and/or of the operating information. In this manner, the first user device 2 can be configured for embedding the graphic element(s) made available into the updated digital map information for display of the map detail predetermined by means of the map detail information, and for selecting the optical output device 3 in response to the map detail information, for display of the predetermined map detail.

The map detail information can comprise, for example, key coordinates of the map detail to be output and/or a center point and a scale characteristic value, for example a zoom factor.

In this manner, it is advantageous if this embedding takes place by means of screen superimposition, which is also called ground overlay or map overlay. In this manner, the information displayed on the optical display device can thereby be superimposed in corresponding layers, and the result of this superimposition can subsequently be displayed.

Fundamentally, the graphic elements can be any desired graphic elements. They can also be symbols, for example, for a speed monitoring unit, which is also called a radar trap. However, they can also symbolize weather information, for example, and have a predetermined color pattern for the intensity of precipitation, for example, as is the case for what is called rain radar, for example.

Thus, the graphic elements can have a predetermined geo-reference, in each instance, and specific geo-data can thereby be assigned to them, such as in the case of a radar trap, for example, which is disposed at a predetermined position on a road. Furthermore, fundamentally, screen position information can also be assigned to the graphic element, in each instance, which is received at the second communication interface 10, with the result that it is shown at a correspondingly predetermined position with reference to the screen, independent of the current scale of the map detail being displayed. This is also referred to as screen overlay. This is advantageous, for example, for display of input selection means, as can be the case for crosshairs, for example.

Furthermore, one or more text information elements can also be determined in the second user device 5, which elements are made available for the first user device 2 at the fourth communication interface 13 of the second user device 5. Thus, for example, a text element assigned to a graphic element can be made available, which comprises a more detailed description of the respective graphic element, for example if a corresponding radar trap was discovered or, in the case of a destination of interest (point of interest), further descriptive text information can be made available.

In this manner, the first communication interface 9 of the first user device 2 can be configured, for example, for making a received text information element available, and the first user device 2 can be configured for embedding the text information element made available into the digital updated map information, for display on the optical output device 3, and can select the optical output device 3 accordingly.

Furthermore, one or more content information elements can also be determined in the second user device 5, which elements are made available to the first user device 2 at the fourth communication interface 13 of the second user device 5.

The respective content information element can be utilized for a display and/or operating visualization element, which is predetermined in the first user device 2 and can also be referred to as a widget. The content information can comprise text and/or graphics and/or numbers and/or control information. It can serve for filling and/or configuring the respective widget.

In this manner, the first communication interface 9 of the first user device 2 can be configured, for example, for making a received content information element available for the display and/or operating visualization element that is predetermined in the first user device 2, and the first user device 2 can be configured for selecting the optical output device 3 for display of the respective display and/or operating visualization element, in accordance with the content information element made available.

Widgets can be used, for example, for visualization of a list or a text bubble or a check box or a slide regulator or a graphic or the like. They are visualized on the optical output device 3 outside of the map detail shown, for example.

It is therefore also possible to select widgets in the first user device 2 by means of the second user device 5. In this manner, what are called map widgets are particularly selected, which comprise displays of the map, any desired positioning and/or zooming of the map, specifically with regard to the map detail to be displayed, drawing of routes, particularly in the form of a poly-line with geo-coordinates and/or drawing of icons. Furthermore, in this manner, points of interest (destinations of interest) can also be passed on and referenced accordingly. Furthermore, graphic representation of screen superimpositions and/or 3D models and/or location markers can take place in a simple manner in this way. Furthermore, zooming or what is called panning can also take place in this way.

Transfer of the content information can take place, between the first and the second user device 5, for example, in accordance with the defaults of the Keyhole Markup Language (KML).

The second user device 5 can furthermore be configured for making a second request message available at the third communication interface 11, for transmission to the central computer device 7. The communication interface 15 of the central computer device 7 can furthermore be configured for receiving the second request message and making it available to the central computer device 7, and the central computer device 7 can be configured for determining the central navigation information as a function of the second request message made available by the second user device 5. This advantageously allows utilizing computing capacity of the second user device 5 in a particularly efficient manner, and also utilizing resources of the central computer device 7 in a simple manner. In this connection, it should be mentioned that the central computer device 7, in particular, can also be disposed or configured to be distributed over different processing units.

Figure 2:
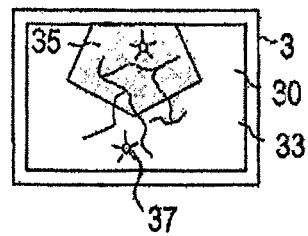

In FIG. 2, a map display 30 based on the updated digital map information for a predetermined map detail is displayed on the optical output device 3 as an example.

The system 1 allows hybrid navigation, in which navigation functions not only of the first user device 2, but also of the second user device 5 can be utilized. Display of the updated map information for hybrid navigation can take place, for example, in such a manner that an observer of the optical output device 3 can recognize in what regions the navigation function of the first user device 2 is being utilized and in what region the navigation function of the second user device 5 is being utilized, and/or whether and in what region information other than the digital first map information of the first user device 2 is being accessed during navigation.

Display of the updated map information can be different, for example, as a function of a current position of the first user device 2. For example, if the first user device 2 is still situated in a first region 33, in which the updated map information represents the first digital map information, a navigation function can be carried out completely by the first user device 2, and display of the first region 33 can take place in a manner familiar to the user of the first user device 2. In a second region 35, in which the updated map information represents the second digital map information, the second digital map information can be displayed transparently superimposed on the original digital first map information, for example.

If the vehicle moves from the first region 33 into the second region 35, for example, an animation can be used to illustrate this state to an observer of the optical output device 3. For example, in this case the second digital map information can be non-transparently superimposed on the original digital first map information in the second region 35. Furthermore, the second region 35 can be shown with an edging.

When the first user device 2 is then situated in the second region 35, the navigation function can be completely performed by the second user device 5, and the first region 33 can comprise transparent superimposition with gray tones. The second region 35 can be displayed with color highlights, for example. Furthermore, a different symbol can be used in the first region 33 and the second region 35, in each instance, to display the vehicle position, for example.

When the vehicle travels out of the second region 35, the animation described above can take place in the opposite order.

Furthermore, the map display comprises multiple radar trap symbols 37 as examples. Alternatively or additionally, other symbols can be displayed. The navigation information transmitted to the first user device 2 can comprise the corresponding map detail information and the graphic element, in each instance, for example.

The navigation information can also comprise voice data and/or haptic data, for example, which can be utilized by the first user device for selecting an acoustical or haptic output device, respectively. In this manner, it is particularly possible, for example, to output driving maneuver comments with regard to the desired route section acoustically.

REFERENCE SYMBOL LIST

1 system
2 first user device
3 optical output device
5 second user device
7 central computer device
9 first communication interface of the first user device
10 second communication interface of the first user device
11 third communication interface of the second user device
13 fourth communication interface of the second user device
15 communication interface of the central computer device
23 first channel connection
25 second channel connection
27 third channel connection
30 map display
33 first region
35 second region
37 radar trap symbol The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A user device comprising:
a memory having digital first map information;
a first communication interface configured for outputting a request message for making navigation information available with regard to at least one desired route section;
a second communication interface configured for receiving navigation information that is made available in response to the request message,
wherein the navigation information comprises digital second map information for at least a part of the at least one desired route section,
wherein the digital second map information comprises data for display of the at least one part of the at least one desired route section; and
wherein the user device is configured to determine digitally updated map information as a function of the digital second map information of the navigation information and of the digital first map information, and to select an optical output device for display of the digital updated map information,
wherein the navigation information is received from a central computer in response to the request message being outputted to the central computer.

2. The user device according to claim 1, wherein the user device is further configured to determine the digital updated map information such that the second digital map information of the navigation information is displayed on the optical output device superimposed on the first digital map information.

3. The user device according to claim 1, wherein the digital second map information comprises data for display of planned travel routes and/or of driving maneuvers along the at least one desired route section and/or of a current position of the user device relative to the at least one desired route section and/or of traffic comments.

4. The user device according to claim 1, wherein the navigation information comprises map detail information and one or more graphic elements, and wherein the user device is further configured to embed the one or more graphic elements into the digital updated map information for display of map detail predetermined by the map detail information, and to select the optical output device for display of the predetermined map detail in response to the map detail information.

5. A system comprising:
a first user device having a first communication interface configured for outputting a request message for making navigation information available with regard to at least one desired route section;
a central computer device having a communication interface configured to receive the request message from the first communication interface of the first user device, wherein the central computer device is configured to make available central navigation information at the communication interface for transmission to the second user device in response to the received request message, wherein the central navigation information comprises the digital second map information for at least one part of the at least one desired route section; and
the second user device comprises a third communication interface and a fourth communication interface, wherein the third communication interface is configured to make available the received central navigation information, and wherein the second user device is configured to make available the navigation information comprising the digital second map information at the fourth communication interface for transmission to the first user device for the at least one part of the at least one desired route section.

6. A system comprising:
a first user device having a first communication interface configured for outputting a request message for making navigation information available with regard to at least one desired route section;
a central computer device having a communication interface configured to receive the request message from the first communication interface of the first user device, wherein the central computer device is configured to make available central navigation information at the communication interface for transmission to the second user device in response to the received request message, wherein the central navigation information comprises basic map information for at least one part of the at least one desired route section; and
the second user device comprises a third communication interface and a fourth communication interface, wherein the third communication interface is configured to make available the received central navigation information, and wherein the second user device is configured to determine the digital second map information of the navigation information as a function of the basic map information, and for making the navigation information available at the fourth communication interface for transmission to the first user device.

7. The system according to claim 5, wherein the fourth communication interface of the second user device is configured to receive received operating information that is made available by the first user device at the second communication interface.

8. The system according to claim 6, wherein the fourth communication interface of the second user device is configured to receive received operating information that is made available by the first user device at the second communication interface.

9. The system according to claim 7, wherein the second user device is configured to determine the digital second information as a function of the operating information.

10. The system according to claim 8, wherein the second user device is configured to determine the digital second information as a function of the operating information.

11. The system according to claim 9, wherein the operating information comprises recorded geographic coordinates for a current position of the first user device.

12. The system according to claim 10, wherein the operating information comprises recorded geographic coordinates for a current position of the first user device.

13. The system according to claim 6, wherein the second user device is configured to determine a most probable position of the first user device with reference to at least one of the digital basic map information and the digital second map information as a function of the geographic coordinates recorded for a current position of the first user device.

14. The system according claim 12, wherein the second user device is configured to determine a most probable position of the first user device with reference to at least one of the digital basic map information and the digital second map information as a function of the geographic coordinates recorded for a current position of the first user device.

15. The system according to claim 13, wherein the second user device is configured to determine the second digital map information as a function of the determined most probable position of the first user device.

16. The system according to claim 14, wherein the second user device is configured to determine the second digital map information as a function of the determined most probable position of the first user device.

17. The system according to claim 4, wherein the second user device is configured to determine the map detail information and the assigned graphic elements of the navigation information as a function of the central navigation information and/or of the operating information.

* * * * *